United States Patent
Lorimor et al.

(10) Patent No.: US 11,151,601 B1
(45) Date of Patent: Oct. 19, 2021

(54) SYSTEMS AND METHODS FOR EVENT DETECTION USING WEB-BASED ADVERTISEMENT DATA

(71) Applicant: Pathmatics, Inc., Santa Monica, CA (US)

(72) Inventors: Thomas George Lorimor, Santa Monica, CA (US); Gabriel Richard Gottlieb, Santa Monica, CA (US); Gregory Hirsch Rosen, Los Angeles, CA (US)

(73) Assignee: Pathmatics, Inc., Santa Monica, CA (US)

( * ) Notice: Subject to any disclaimer, the term of this patent is extended or adjusted under 35 U.S.C. 154(b) by 323 days.

(21) Appl. No.: 16/248,404

(22) Filed: Jan. 15, 2019

Related U.S. Application Data (63) Continuation of application No. 14/566,406, filed on Dec. 10, 2014, now abandoned.

(51) Int. Cl.
*G06Q 30/02* (2012.01)

(52) U.S. Cl.
CPC .................. *G06Q 30/0242* (2013.01)

(58) Field of Classification Search
None
See application file for complete search history.

(56) References Cited

U.S. PATENT DOCUMENTS

| | | | | |
|---|---|---|---|---|
| 2007/0027760 A1* | 2/2007 | Collins | ................. | G06Q 30/02 705/14.54 |
| 2007/0033103 A1* | 2/2007 | Collins | .............. | G06Q 30/0256 705/14.41 |
| 2011/0125587 A1* | 5/2011 | Netzer | ............... | G06Q 30/0272 705/14.68 |
| 2011/0282860 A1* | 11/2011 | Baarman | ............... | G06F 16/951 707/709 |
| 2013/0073336 A1* | 3/2013 | Heath | .................... | G06Q 30/02 705/7.29 |
| 2014/0229271 A1* | 8/2014 | Clapp | ................ | G06Q 30/0245 705/14.44 |

OTHER PUBLICATIONS

G. Amin Shawki, "Google Analytics 101: Using Alerts", available on Aug. 9, 2012, retrieved from https://infotrust.com/articles/google-analytics-101-using-alerts/ (Year: 2012).*

* cited by examiner

*Primary Examiner* — Sam Refai
(74) *Attorney, Agent, or Firm* — Morgan, Lewis & Bockius LLP (57) ABSTRACT

Systems and methods are provided for accumulating network accessible marketplace data, determining various originating sources of the marketplace data, detecting changes in the marketplace data, and notifying users of the detected changes. The marketplace data may include advertisement data associated with advertisements on publisher web pages. The originating sources may be the publisher web pages or any of various advertising channels such as ad networks, ad services, or demand side platforms that place the advertisements on the web pages. Notifying the users may include generating a timeline and a human-readable story from the advertisement data and providing the timeline and the story to the user via a web-based interface or a notification communication such as a push notification to a device of the user.

16 Claims, 8 Drawing Sheets

SYSTEMS AND METHODS FOR EVENT DETECTION USING WEB-BASED ADVERTISEMENT DATA

RELATED APPLICATION

The present application is a continuation of, and claims the benefit of and priority to, U.S. patent application Ser. No. 14/566,406, filed Dec. 10, 2014, which is hereby incorporated by reference in its entirety for all purposes.

BACKGROUND OF THE INVENTION

This invention relates generally to web-based information and, more specifically, to discovery and tracking of web-based advertisements.

Publisher websites such as newspaper web pages, television station web pages, web log web pages, magazine web pages, social networking web pages, microblogging web pages, other internet-based online publishing sources, mobile applications, and other internet connected applications often include advertisements for companies and products. Advertisements on a publisher website may include images, videos, text, animations, or other visual or audio messages. These advertisements are sometimes referred to as advertisement creatives.

Advertisements may be placed on a publisher web page by a variety of sources. A company may purchase an advertisement block on the publisher web page directly from the publisher, through an advertising network, through an advertising exchange, through a demand side platform (DSP) or through some combination of these or other advertising channels.

Systems have been developed for detecting and tracking web-based advertisements. However, due to the vast numbers of publisher web pages, advertisers, advertisement creatives, advertising channels, and other web-based information, it can be difficult to present even processed and condensed web-based advertisement data to a user in a way that is easily comprehensible and from which significant information can be easily extracted.

It would therefore be desirable to be able to provide improved systems for discovering and tracking of internet-based advertisements.

SUMMARY OF THE INVENTION

Systems and methods are provided for discovering and tracking advertisements and other web-based marketplace information on published internet web pages and other media sources such as mobile applications.

An advertisement tracking and discovery system may include advertisement discovery equipment, storage such as cloud-based storage, internet proxy servers, data analysis and storage equipment, and user-interface equipment for discovering advertisements on publisher web pages and for determining the pathway (e.g., the channel or combination of channels) by which each advertisement has been placed on a publisher web page.

The advertisement discovery equipment may spider or crawl various publisher web pages or other media sources by sending a Hypertext Transfer Protocol (HTTP) request to the Universal Resource Locator (URL) of each publisher website and each linked website or resource. The advertisement discovery equipment may gather and store HTTP request data associated with each HTTP request and may use time information associated with each HTTP request in combination with other information such as redirect response headers and response body information to discover advertisements and to determine pathways by which advertisements and other content were placed on a particular site.

The data analysis and storage equipment may receive and accumulate processed advertisement data from computing equipment associated with various installations of advertisement discovery equipment in various geographic locations and combine the accumulated processed advertisement data to form user-accessible aggregated advertisement data. The data analysis and storage equipment may extract and track various advertisement measures from the accumulated data.

The data analysis and storage equipment may identify a change in the accumulated processed advertisement data (e.g., a change in an advertisement measure). For example, a change such as a spike in the number of impressions for an advertisement or advertiser, a change in the impression share, a new creative release or other change (e.g., a change in the advertiser rank for a particular site or channel, a change in the number of sites per day on which an advertisement appears, an advertiser places ads, or an advertisement channel places ads, or a change in the top site or top channel for an advertiser) associated with the advertisements may be detected.

The data analysis and storage equipment may generate a story associated with the identified change. For example, a story may be generated when a change is greater than the threshold. The story may be a titled, human-readable, description of the change. The story may include numerical and/or statistical information, generated from the accumulated processed advertisement data and associated with the identified change. For example, the story may include a number of new creatives in a new-creatives story, an impressions percentage in a partner-activity story, or a multiplier in an impression-spike story as described further hereinafter.

The data analysis and storage equipment may provide the aggregated advertisement data to the user-interface equipment for access by a customer. If desired, the data analysis and storage equipment may provide a portion of the aggregated data directly to the customer by generating an email, text message, social media message, or other direct contact message containing some or all of the aggregated data. The data analysis and storage equipment and/or the user interface equipment may notify customers of updates periodically or in response to a detected change in one or more portions of the aggregated data.

Systems and methods may therefore be provided that provide vast amounts of marketplace activity across related and unrelated portions of the internet from related and unrelated sources to users in a form that can be quickly and easily understood and used to inform time-sensitive business, financial, and other strategic decisions for the user.

Further features of the invention, its nature and various advantages will be more apparent from the accompanying drawings and the following detailed description of the preferred embodiments.

DETAILED DESCRIPTION

The present disclosure relates generally to systems and methods for identifying and tracking electronic advertisements and, more particularly, to systems for generating user-comprehensible advertisement data associated with the identified and tracked electronic advertisements. Advertisements, and the pathways by which the advertisements have been placed on publisher websites, may be discovered using an advertisement tracking and discovery system.

The system may include advertisement discovery equipment that discovers the pathways by which the advertisements have been placed on publisher websites. The system may use data analysis and storage equipment or other computing equipment to process, aggregate and provide customer access to the gathered advertisement information.

Figure 1:
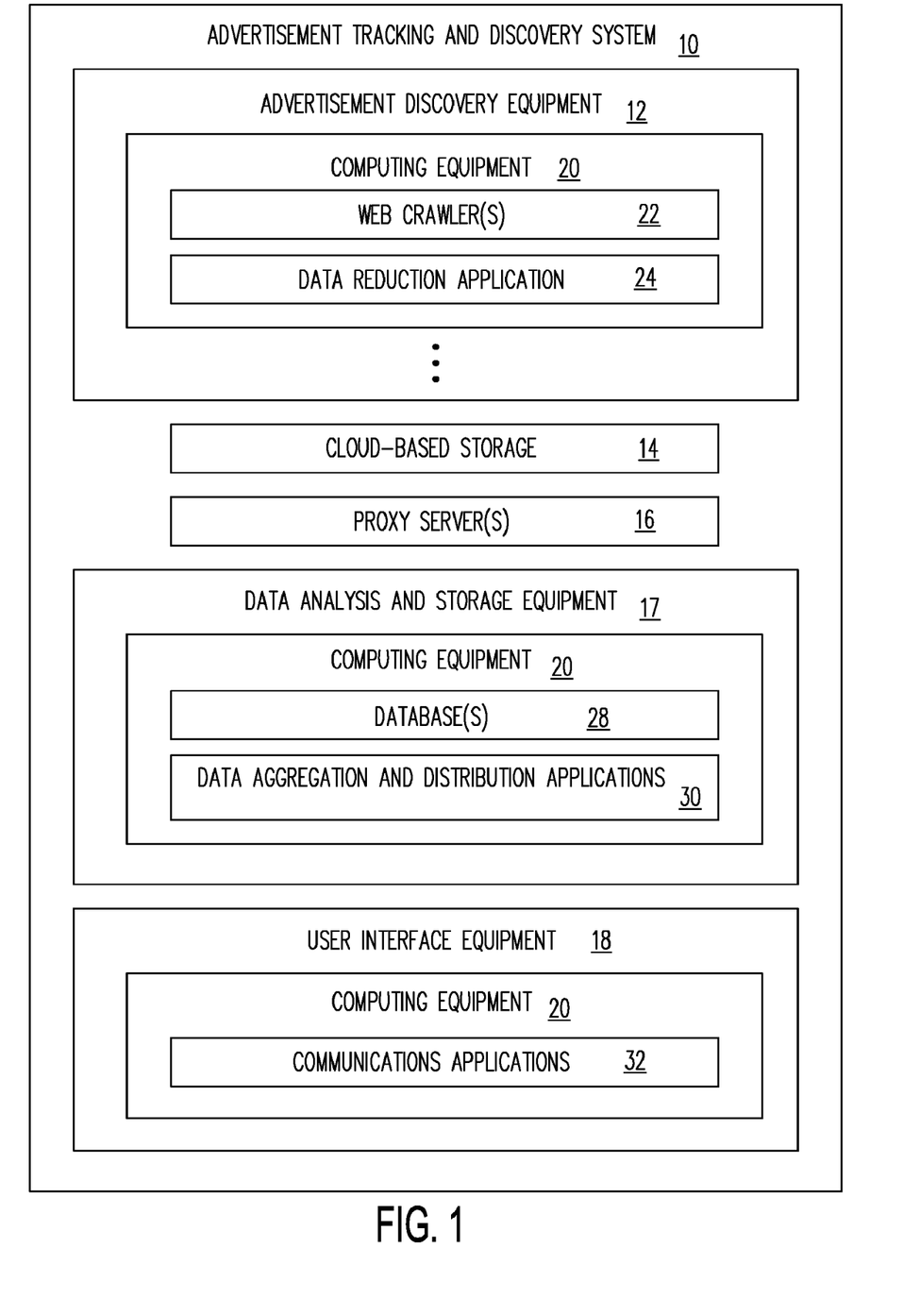
FIG. 1 is a diagram of an illustrative system for discovering and tracking web-based advertisements in accordance with an embodiment of the present invention.

An illustrative advertisement tracking and discovery system is shown in FIG. 1. Advertisement tracking and discovery system 10 may include advertisement discovery equipment 12, one or more databases such as cloud-based storage 14, remote servers such as proxy servers 16, data analysis and storage equipment 17, user interface equipment 18 and/or other computing equipment.

Advertisement discovery equipment 12 may include computing equipment 20. Computing equipment 20 may include one or more personal computers, workstations, computers configured as servers, mainframe computers, portable computers, etc. Computing equipment 20 may include processing circuitry, communications circuitry, displays, input-output devices, and storage (e.g., hard drives, volatile memory, non-volatile memory, and/or other storage media or non-transitory computer-readable media including contents that can be executed by a computing system). Computing equipment 20 of advertisement discovery equipment 12 may be used to run code for software applications such as one or more web crawling applications 22 and data processing applications such as data reduction application 24. Data reduction application 24 may be used to process advertisement related data that has been gathered using web crawler(s) 22 (e.g., modified web crawling web browsers or dedicated web crawling applications).

System 10 may include storage that is co-located with computing equipment 20 of system 10 and/or remote storage such as cloud-based storage 14. If desired, advertisement discovery equipment 12 and/or data analysis and storage equipment 17 may be used to access stored information from cloud-based storage 14 and/or provide information to cloud-based storage 14. Cloud-based storage 14 may include storage media such as hard drives, volatile memory, non-volatile memory, and other storage media associated with workstations, computers configured as servers, mainframe computers, portable computers, etc.

Data analysis and storage equipment 17 may include computing equipment 20. Computing equipment 20 of data analysis and storage equipment 17 may be co-located with computing equipment 20 of advertisement discovery equipment 12 or computing equipment 20 of data analysis and storage equipment 17 may be separate from computing equipment 20 of advertisement discovery equipment 12.

As examples, computing equipment 20 of data analysis and storage equipment 17 and computing equipment 20 of advertisement discovery equipment 12 may be implemented using a common computing platform, using separate computing platforms in a common room in a building, using separate computing platforms in separate rooms in a common building or using separate computing platforms in a common geographic location (e.g., a common city). However, this is merely illustrative. If desired, computing equipment 20 of advertisement discovery equipment 12 may include multiple computing platforms in multiple geographic locations that are separated from computing equipment 20 of data analysis and storage equipment 17. As examples, computing equipment 20 of advertisement discovery equipment 12 may include separate computing platforms in multiple cities that provide advertisement data to data analysis and storage equipment 17 that is located in an additional city.

Advertisement discovery equipment 12 may use web crawler(s) 22 to access and explore publisher web pages and/or other media sources, gather advertisement related data from those publisher web pages or other media sources, process the gathered data, and provide the processed data to data analysis and storage equipment 17. Data analysis and storage equipment 17 may be used to accumulate, aggregate, process, and store advertisement related data.

Computing equipment 20 of data analysis and storage equipment 17 may include storage such as one or more databases 28 and other computing equipment (e.g., one or more personal computers, workstations, computers configured as servers, mainframe computers, portable computers, processing circuitry, displays and input-output devices) that can be used to run code for software applications such as one or more data aggregation and distribution applications 30. Data aggregation and distribution applications 30 may be used to accumulate and aggregate data received from advertisement discovery equipment 12 and, if desired, to generate customer alert notifications.

User interface equipment 18 may be used to provide a user such as a customer with access to advertisement related information such as aggregated advertisement data stored in data analysis and storage equipment 17. Computing equipment 20 of user interface equipment 18 may include one or more personal computers, workstations, computers configured as servers, mainframe computers, portable computers, etc.

Computing equipment 20 of user interface equipment 18 may include processing circuitry, communications circuitry, displays, input-output devices, and storage (e.g., hard drives, volatile memory, nonvolatile memory, and other storage media). Computing equipment 20 of user interface equipment 18 may form a portion of computing equipment 20 of data analysis and storage equipment 17 or may be formed separately from computing equipment 20 of data analysis and storage equipment 17.

Computing equipment 20 of user interface equipment 18 may be used to run code for software applications such as one or more communications applications 32. Communications applications 32 may be used to provide customers with access to advertisement related information such as aggregated advertisement data that is stored in data analysis and storage equipment 17.

Communications applications 32 may include a web portal for providing authenticated web access to portions of data stored in data analysis and storage equipment 17 (e.g., using a customer's web browser or other application such as a downloadable app on a customer's device), a file-transfer-protocol application for providing bulk access to portions of data stored in data analysis and storage equipment 17, an Application Programming Interface (API), and/or an email, text message, social media message, or other direct message generating application that generates and sends alert notifications to customers (e.g., periodic alert notifications and/or notifications generated in response to a detected change in advertisement related information).

Data analysis and storage equipment 17 may detect one or more changes in marketplace data such as advertisement related data. A change in marketplace data such as advertisement related data may be detected, for example, by detecting an increase such as a one day increase in an advertisement measure, determining a ratio or difference of the detected increase to an average such as a 30 day average, and comparing the ratio or difference to a threshold. A change may also or alternatively be detected by determining an average or median of an advertisement measure such as an impression percentage over a configurable sliding window such as a one day window, a multiple day window, a weekly window, a monthly window, a quarterly window, a yearly window or other window; determining a ratio or difference of the measure of the current window to that of a previous window; and comparing the ratio or difference to a threshold.

The period of time (e.g., the size of the window) may be selected and/or adjusted to prevent noise in the advertisement data from generating false positive detections of change. If desired, other noise reduction operations such as smoothing or filtering operations may be performed on the advertisement data (e.g., on a timeline or other time series data generated from the advertisement data) to prevent noise in the advertisement data from generating false positive detections of change. User-comprehensible data such as a timeline and one or more associated stories may be generated based on the advertisement data and the detected changes and may be provided to a user.

Figure 2:
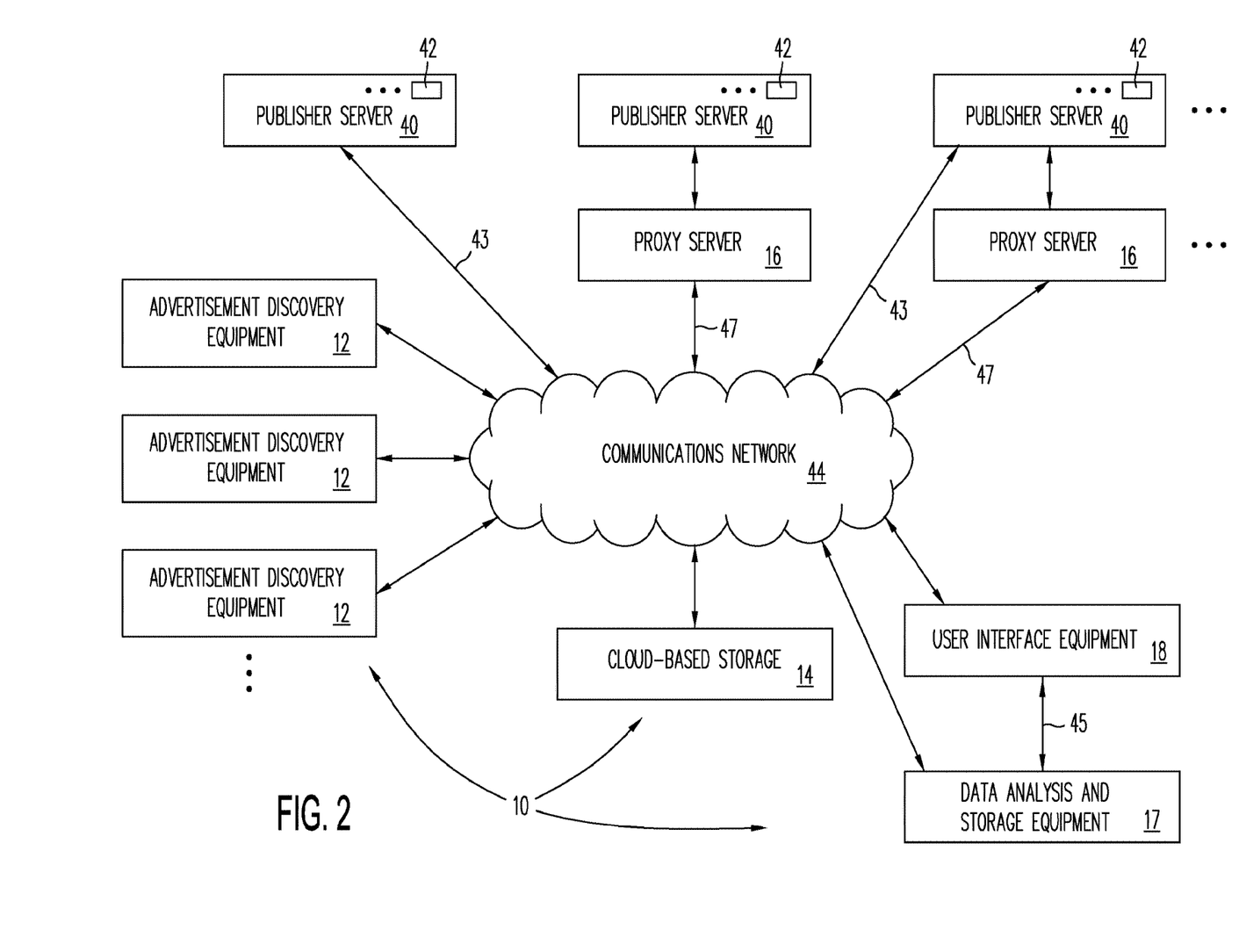
FIG. 2 is an illustrative diagram showing how portions of a system of the type shown in FIG. 1 may communicate with other portions of the system and with publisher servers over a communications network in accordance with an embodiment of the present invention.

FIG. 2 shows how portions of system 10 may communicate with other portions of system 10 and/or with publisher computing equipment such as publisher servers 40 over a communications network such as communications network 44. Communications network 44 may be a local area network, a wide area network such as the internet, or a combination of one or more local area networks and a wide area network.

As shown in FIG. 2, system 10 may include multiple implementations of advertising and discovery equipment 12 connected to one or more of multiple publisher servers 40 over network 44.

One or more web crawlers 22 running on each implementation of advertisement discovery equipment 12 may be used to access and explore one or more publisher web pages 42 that are hosted on publisher servers 40. If desired, web crawlers 22 running on computing equipment 20 of advertisement discovery equipment 12 in one geographic location (e.g., a country or a region of a country) may be used to access and explore publisher web pages in that geographic location. However, this is merely illustrative. If desired, web crawling applications 22 running on computing equipment 20 of advertisement discovery equipment 12 in one geographic location may access publisher servers 40 in another geographic location (e.g., another country or another region of a country) directly (as indicated by lines 43) or though a proxy server 16 (as indicated by lines 47) that is located in a common geographic location (e.g., a common country or region of a country) with those publisher servers 40.

During operation of system 10, advertisement discovery equipment 12 may obtain a list of universal resource locators (URLs) of publisher websites 42 to be explored from cloud-based storage 14. Web crawlers running on advertisement discovery equipment 12 may then access the websites associated with those obtained URLs and each linked web page, resource, or application associated with those URLs. However, this is merely illustrative. If desired, advertisement discovery equipment 12 may be used to generate the list of URLs to be explored. As examples, advertisement discovery equipment 12 may be provided with a single publisher URL and generate a list of related publisher URLs to be explored by crawling (spidering) the single publisher URL or advertisement discovery equipment 12 may access a publisher website associated with a URL that has been previously accessed and generate a list of related publisher URLs to be explored by re-crawling the previously accessed publisher URL.

In some embodiments, advertisement discovery equipment 12 may load a set of cookies associated with a selected profile of a particular type of internet user into one or more of web crawlers 22 prior to accessing and exploring a particular web page. In this way, advertisement discovery equipment 12 can simulate a user having user traits associated with that particular type of user profile accessing and exploring the publisher web page and can detect advertisements, advertisement channels, and obscured advertisements that may be presented to that particular type of user.

Advertisement discovery equipment 12 may gather advertisement data associated with each URL and process the gathered data to identify advertisements associated with each URL and additional information such as advertising channels responsible for placing those advertisements on the web page associated with that URL.

In some situations, advertisements such as advertiser-related images, videos, flash content, text links, or other advertisements are placed on a publisher's web page by the publisher itself. In other situations, a publisher may sell advertising space to third party companies that sell that advertising space to advertisers and advertisements may be placed on the publisher web page by the third party company. Third party companies may include services such as advertising networks, advertising exchanges, demand side platforms (DSPs), sell side platforms (SSPs), data platforms, and advertiser advertising servers.

Advertising discovery equipment 12 may identify advertisements associated with each URL and advertising channels (e.g., publishers, advertising networks, advertising exchanges, demand side platforms (DSPs), sell side platforms (SSPs), data platforms, and advertiser advertising servers, or combinations thereof) responsible for placing those advertisements by recording each individual request made in the loading of the a publisher website. These requests may be for content of many forms (e.g., image content, text content, binary content, etc.) which may be used for many different purposes (e.g., information for a user, advertisements, data gathering, etc.).

Advertising discovery equipment 12 may process the recorded requests and responses associated with the requests and identify a cause and effect relationship between the one or more requests and/or one or more groups of requests. In the process of loading a website 42, one request may cause other requests to be made. For example, when a Hypertext Markup Language (HTML) page is loaded, it may include references to other HTML, JavaScript, Adobe Flash®, or other resources to be loaded. In order to fully load the website, these referenced resources may also be loaded.

A cause and effect relationship may then be identified between the original HTML page that was loaded (in this example) and other referenced resources. These cause and effect relationships may be used to identify placement pathways by which content has been placed on a publisher website.

Data analysis and storage equipment may, if desired, further process and store the received processed advertisement data. For example, the data analysis and storage equipment may determine and track a number of impressions for a particular advertisement (e.g., a creative) on one or more sites, for a particular advertising campaign on one or more sites, for a particular ad network on one or more sites, for a particular ad service on one or more sites, and/or for a particular advertisement or advertising campaign via a particular advertisement channel (as examples). An impression may be a single display of a particular advertisement (e.g., a creative) on a publisher web page.

As another example, the data analysis and storage equipment may determine and track impression shares for an advertisement, an advertising campaign, an advertiser and/or an advertising channel (as examples). An impression share may be a ratio of impressions for a particular advertiser or advertising campaign to a total number of impressions on a particular publisher web page or to a total number of impressions sold by a particular advertising channel or to a total number of impressions sold across the internet (as examples). The impression share may be determined per day, per hour, per week, per month, per year, or for any suitable time period including a user-selected time period.

As another example, the data analysis and storage equipment may determine and track a number of new creatives displayed for an advertising campaign and/or an advertiser (as examples) over a period of time.

User interface equipment 18 may be used to provide customer access to the advertisement related data stored by data analysis and storage equipment 17. User interface equipment 18 may provide processed aggregated advertisement data such as one or more timelines having event indicators and user-friendly, human-readable output data (sometimes referred to as "stories" herein) associated with each event indicator to a user. User interface equipment 18 may be connected to data analysis and storage equipment 17 through network 44 or through a direct connection (as indicated by line 45).

Figure 3:
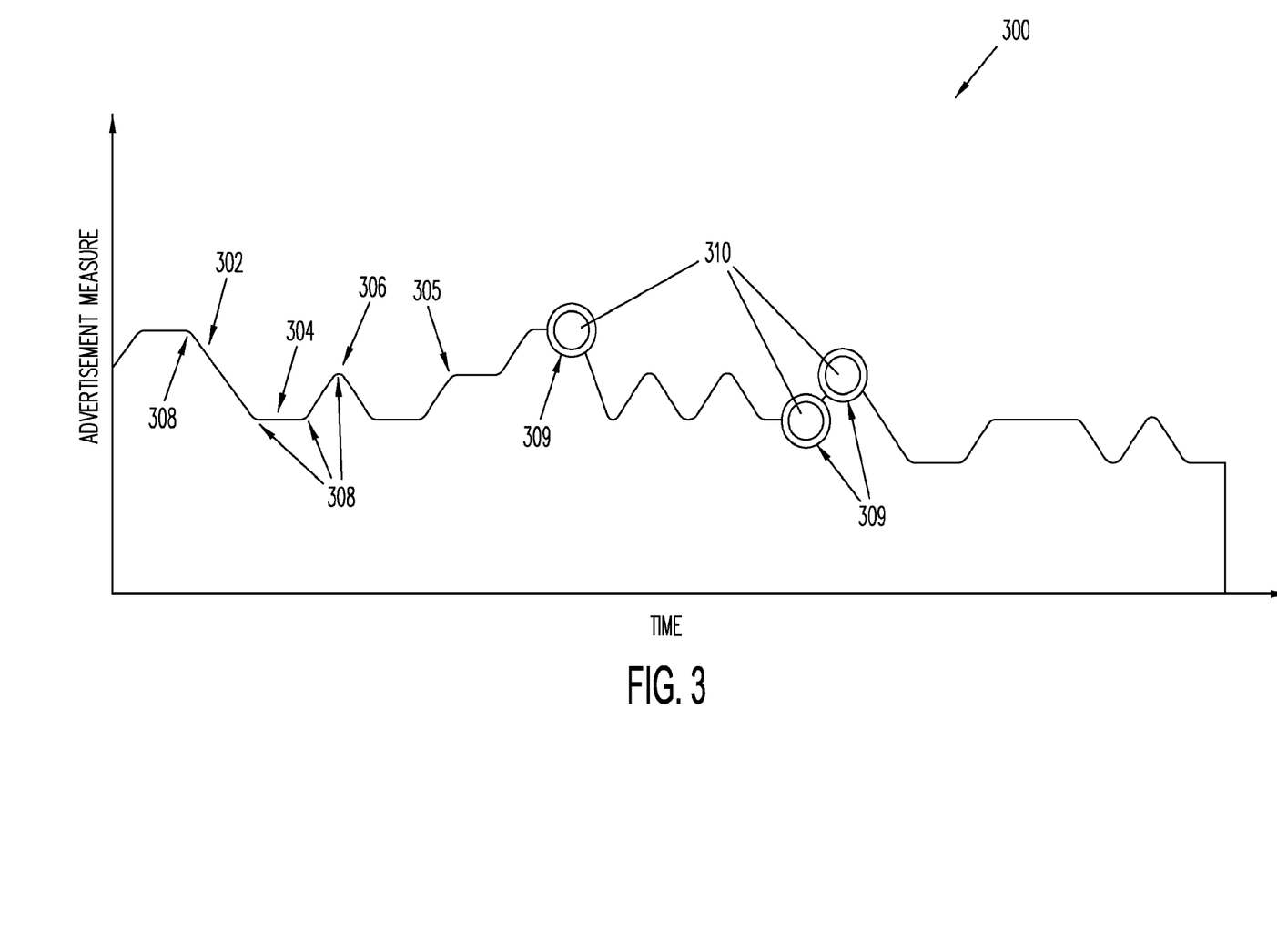
FIG. 3 is a diagram of a timeline having event indicators in accordance with an embodiment of the present invention.

FIG. 3 is a diagram of a timeline that may be generated from aggregated advertisement data. As shown in FIG. 3, a timeline such as timeline 300 may include a graph of a particular advertisement measure over time. An advertisement measure may be an impression share, a number of impressions, a number of new creatives, a percentage of impressions of a particular advertiser that were sold via various advertising channels, a percentage of impressions on a particular publisher web page, a percentage of impressions sold via a particular advertising channel for various advertisers, or other measures of the number, frequency, percentage, and/or share of advertisements placed for various advertisers and/or advertising campaigns via various advertising channels on various sites or other media sources.

A timeline such as timeline 300 may show various changes in the advertisement measure over time and may include various inflection points 308, valleys 304, peaks 306, decreases 302 and/or increases 305. Data processing and storage equipment 17 may detect inflection points 308, valleys 304, peaks 306, decreases 302 and/or increases 305. Data processing and storage equipment 17 may determine one or more averages of the advertisement measure (e.g., a one-day average, a seven-day average, a 30-day average, a one-year average or other average value), medians of the advertisement measure, standard deviations of the advertisement measure, or other statistical information associated with the advertisement measure.

Data processing and storage equipment 17 may determine the size of a particular increase 305 such as a one-day increase, the size of a particular decrease 302 such as a one-day decrease, or a rate of change associated with a particular inflection point 308. Data processing and storage equipment 17 may compare a determined size or rate of change with a computed average, median, or other statistical measure for one or more inflection points 308, valleys 304, peaks 306, decreases 302 and/or increases 305 (e.g., by computing a ratio of the size or rate of change to the statistical measure).

Data processing and storage equipment 17 may compare the ratio to a threshold. Ratios that exceed the threshold may be used to indicate one or more significant points 309 on timeline 300. Significant points 309 may indicate marketplace events that may be of particular interest to a user.

Data processing and storage equipment 17 may analyze additional information to determine whether any or all of inflection points 308, valleys 304, peaks 306, decreases 302 and/or increases 305 are significant points 309. For example, characteristics of other advertisement measures at the same time as a particular inflection point 308, valley 304, peak 306, decrease 302 and/or increases 305 of timeline 300 may be analyzed to identify significant points 309. For example, if the advertisement data associated with timeline 300 indicates an impression spike for a particular advertiser and the advertisement data also indicates a large number of new creatives detected at the same time as the impression spike, it may be determined that a large new ad buy was made by the advertiser. A story may then be generated regarding the impression spike, the new creatives, and/or the ad buy. An indicator 310 may also be generated at a significant point 309 on timeline 300 when displayed to a user to indicate the detected significant point and the time of the associated story and/or event.

Timeline 300 may be generated before or after detecting inflection points 308, valleys 304, peaks 306, decreases 302 and/or increases 305 and significant points 309. Timeline 300 with event/story indicators 310 may be provided to a user in an aggregated data display along with one or more stories associated with each indicator.

Figure 4:
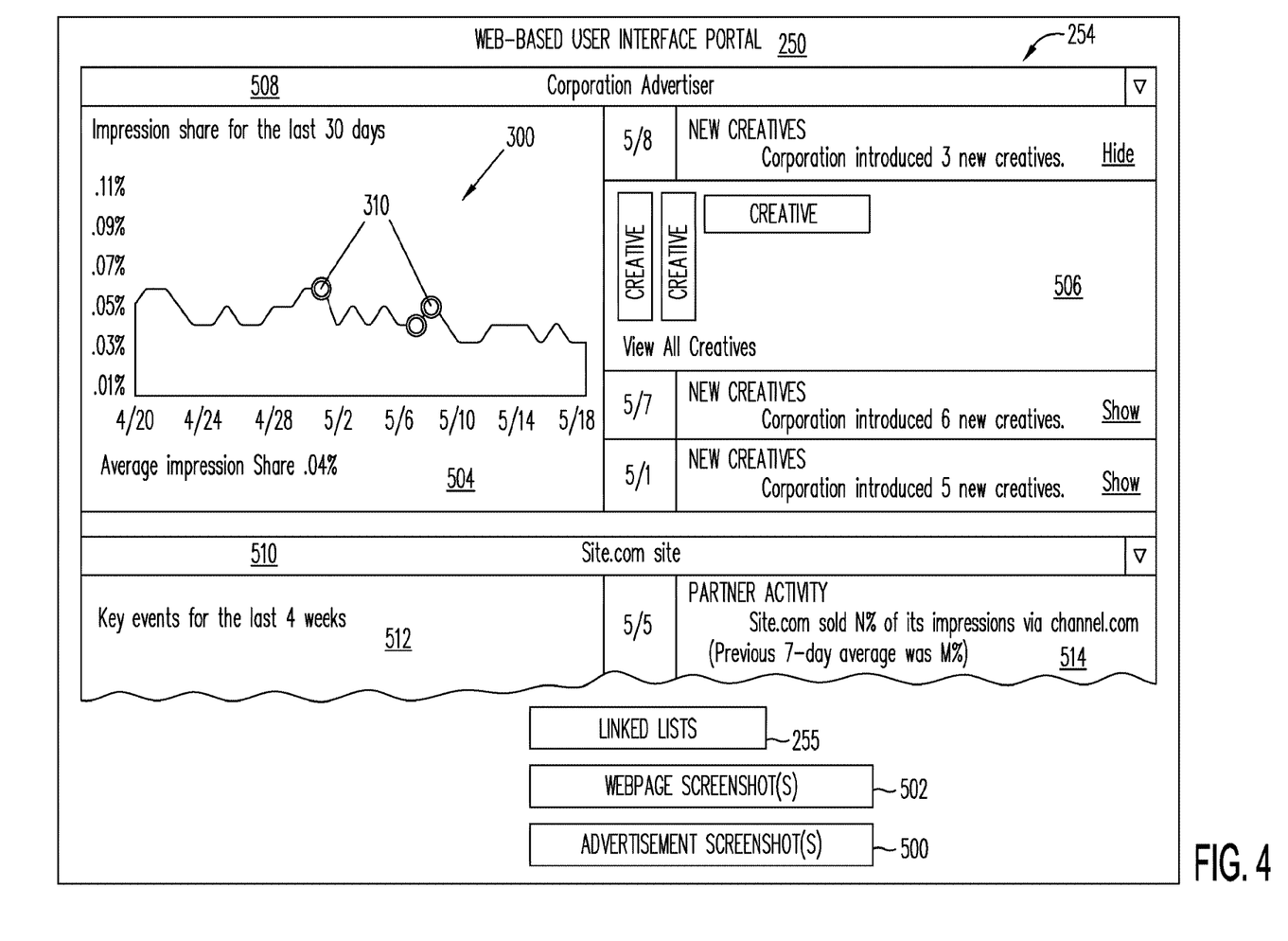
FIG. 4 is a diagram of an illustrative user interface portal for providing aggregated advertisement data to a customer in accordance with an embodiment of the present invention.
Figure 5:
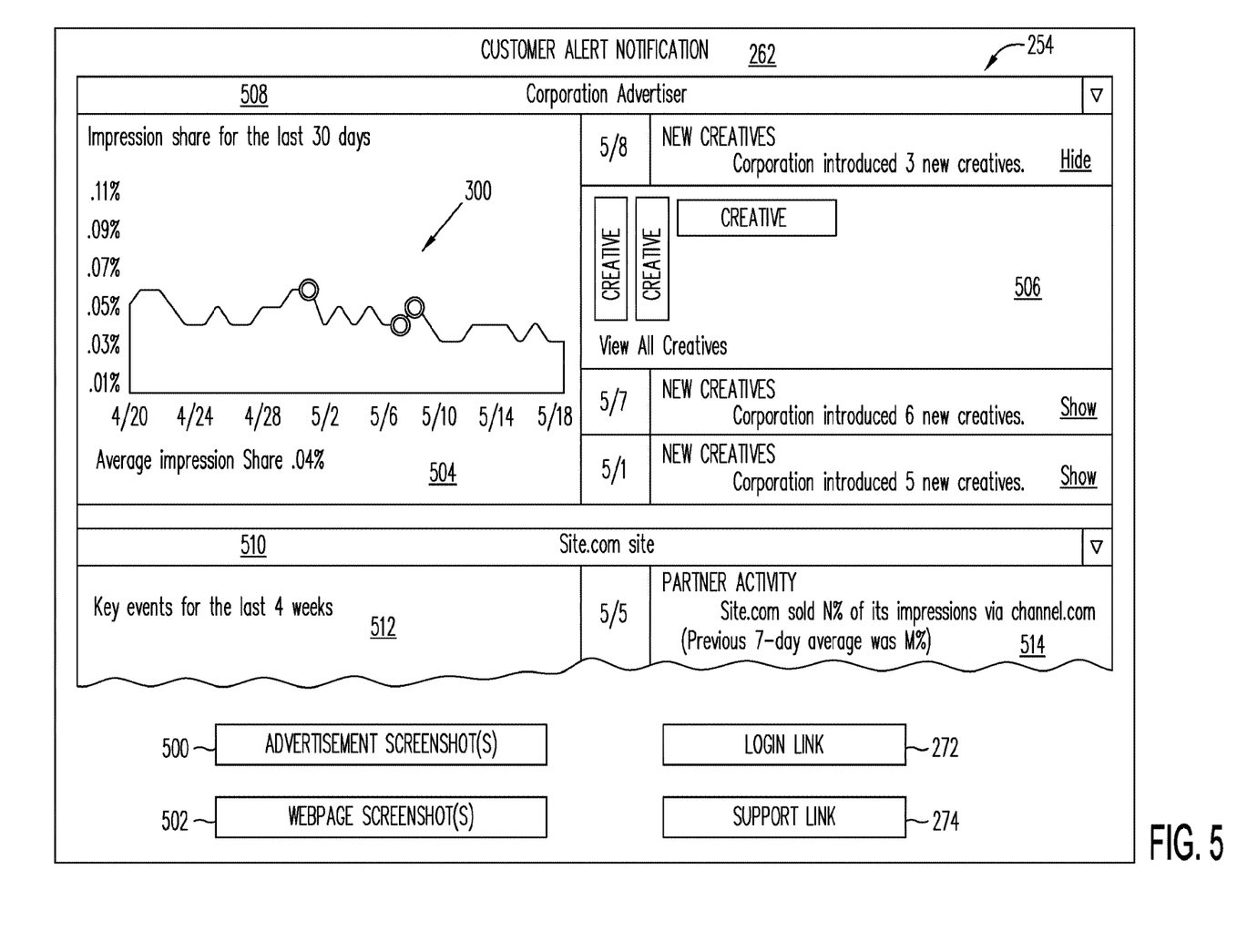
FIG. 5 is a diagram of an illustrative customer alert notification for providing aggregated advertisement data to a customer in accordance with an embodiment of the present invention.

FIGS. 4 and 5 show exemplary web-based and alert-based aggregated data displays respectively for presenting advertisement data such as timelines and stories to users. In the example of FIG. 4, user data is provided in an illustrative web-based user interface portal. Web-based user interface portal 250 may, for example, be a web site that is accessible to a customer following authentication with a customer user name and password.

As shown in FIG. 4, web-based user interface portal 250 may include a set of links 255 such as clickable links that control the data provided in an aggregated data display 254. Aggregated data 254 may include one or more sub-portions such as advertiser-specific data display 508 and site-specific data display 510. Advertiser-specific data display 508 may include information associated with a particular advertiser (e.g., an advertiser "Corporation" in the example of FIG. 4). Site-specific data display 510 may include information associated with a particular site or publisher web page (e.g., "site.com" in the example of FIG. 4). Aggregated data 254 may also include other displays (not shown) that are specific to a particular advertising channel, a specific creative, or a specific advertising campaign (as examples). Aggregated data 254 may, for example, be displayed in a "dashboard" portion of a user account section of a website or application provided by user interface equipment 18 (see FIG. 1).

Data displays such as data displays 508 and 510 may each include a timeline having one or more event indicators and one or more stories associated with each event indicator. In the example of FIG. 4, advertiser-specific data display 508 includes a timeline window 504 with a timeline 300 showing an impression share for the last 30 days for the advertiser and including several indicators 310 of significant events. Advertiser-specific data display 508 also includes a story window 506 having a story associated with each indicator 310. As shown, site-specific data display 510 may also include a timeline window 512 and an associated story window 514 (each of which is partially shown).

As shown in FIG. 4, interface portal 250 may include one or more advertisement screenshots 500 and/or one or more web page screenshots 502. For example, an advertisement screenshot 500 be a creative image that, when clicked, may cause the system to display the creative image in a new window and/or to display advertisement data associated with that creative. Webpage screenshot 502 may be a clickable image that, when clicked, causes the system to display an advertisement creative in the context in which it was displayed on a web page. Screenshots 500 and 502 may be displayed separately from data display 254 or may be embedded within data display 254.

If desired, in addition to or instead of providing access to a website such as web-based user interface portal 250 of FIG. 4 a customer may be provided with access to aggregated data by sending the customer an alert notification such as customer alert notification 262 of FIG. 5. Customer alert notification 262 may be an email, a text message, a social media message, an API message, or any other suitable direct contact message.

As shown in FIG. 5, notification 262 may include aggregated data display 254, advertisement screenshots 500 and webpage screenshots 502. Notification 262 may include a login link 272 for directing the customer to a website such as web portal 250 of FIG. 16, and a support link such as support link 274 for directing the customer to help services for using or understanding system 10 and/or aggregated data.

Notifications such as notification 262 may be generated and sent to a customer periodically (e.g., daily, weekly or monthly) or in response to an identified change in advertising methods, channels or trends that may be of interest to the customer such as an event associated with one of indicators 310 and/or stories associated with an indicator.

Figure 6:
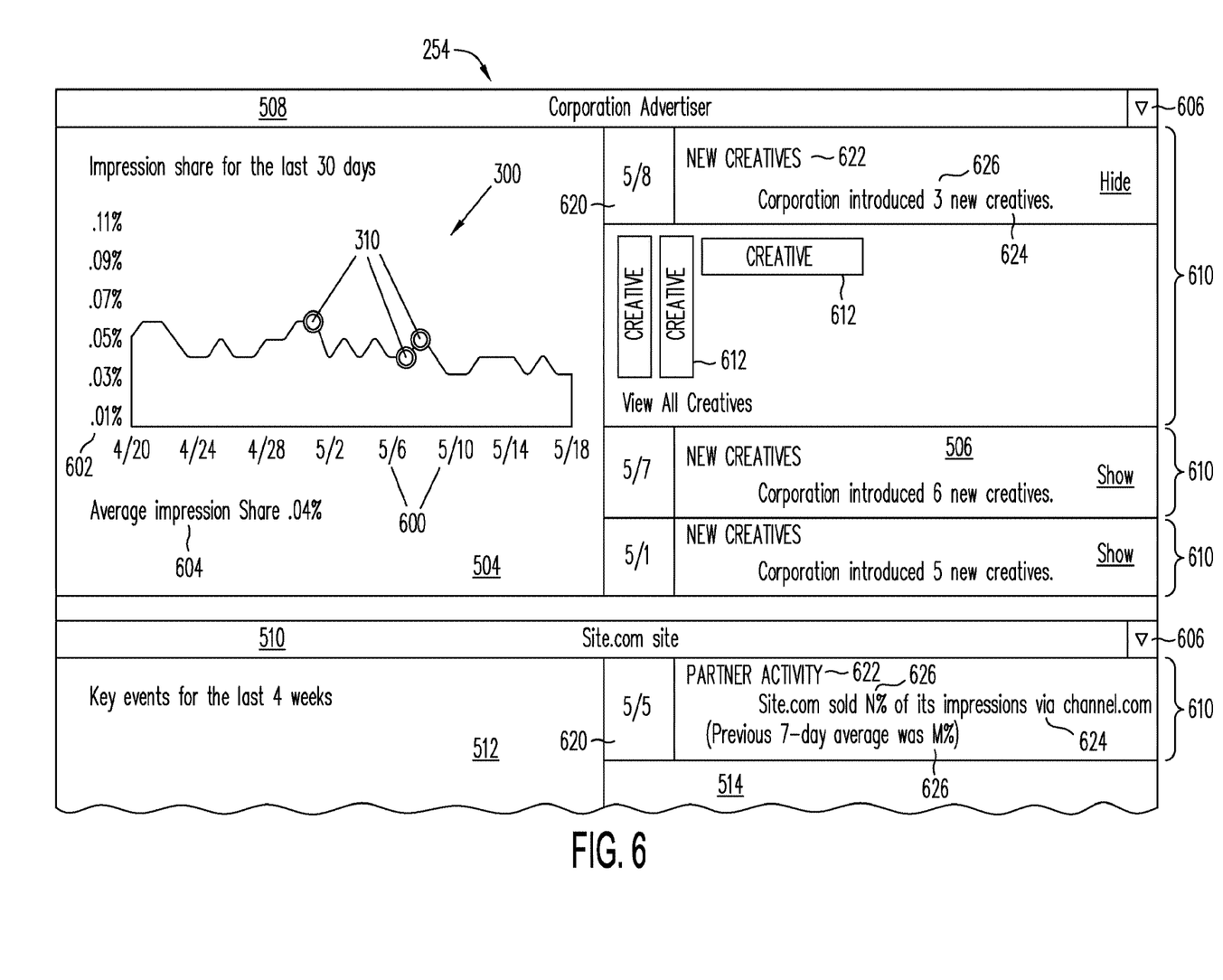
FIG. 6 is a diagram of an illustrative aggregated data display having timelines and stories in accordance with an embodiment of the present invention.

A more detailed view of aggregated data display 254 is shown in FIG. 6. As shown in FIG. 6, timeline 300 may include a first axis having a plurality of dates 600 and a second axis having percentage values 602 that each indicate an impression share level. Timeline window 504 may also include statistical information 604 such as an average impression share over the time span of timeline 300 (e.g., an average impression share of 0.04% over 30 days in the example of FIG. 6).

Story windows 506 and 514 may each include one or more stories 610. Each story may be associated with an event indicator 310 on a timeline 300. As shown, a story 610 may include a date 620, a story type 622, and story text 624. Story text 624 may include user-friendly, human-readable text and numerical information 626. For example, story window 506 includes three "NEW CREATIVES" stories associated with new creatives that were detected. Each new-creative story includes a number of new creatives detected on a particular day. Stories 610 may include creatives 612 themselves. Creatives 612 may be creative images (e.g., still or video images) or thumbnail or text links to creative images (as examples).

Site-specific data display 510 may include a "PARTNER ACTIVITY" story associated with advertising partners of the site such as various advertising channels. Partner-activity stories may include numerical information 626 embedded in text 624 such as a percentage of impressions sold via a particular advertising channel (e.g., "channel.com" in the example of FIG. 6). Partner-activity story may include, for comparison, an average impression percentage. In the example of FIG. 6, an exemplary website "site.com" is indicated as having sold N % of its impressions by an exemplary advertising channel "channel.com". This N % percentage may be provided along with an M % average over a particular period such as the previous seven days.

The partner-activity story may be generated when N is greater than M by a particular threshold amount or when N/M is greater than a ratio threshold amount (as examples). Partner-activity stories of this type can be particularly useful to advertisers, web page publishers, and advertising channels. For example, if a particular advertiser previously sold 5% of its impressions through a particular channel over 7 days and, on May 5, sold 60% of its impressions through that channel, competitor channels may be interested to know what that channel did to increase its sales. However, this is merely illustrative. In various scenarios, advertisement tracking and discovery system 10 may be structured to identify any marketplace events using gathered and tracked web-based information and to disseminate marketplace event information to users (e.g., using stories and/or timelines) to provide a competitive advantage for advertisers, publishers, and/or advertising channels.

As shown in FIG. 6, each data display window (e.g., windows 508 and 510 or other data display windows such as publisher-specific data display windows, creative-specific data display windows, or campaign-specific data display windows) may include a header 606 identifying the type of data display window and the specific entity (e.g., a specific advertiser, site, channel, publisher, creative, or campaign).

Figure 7:
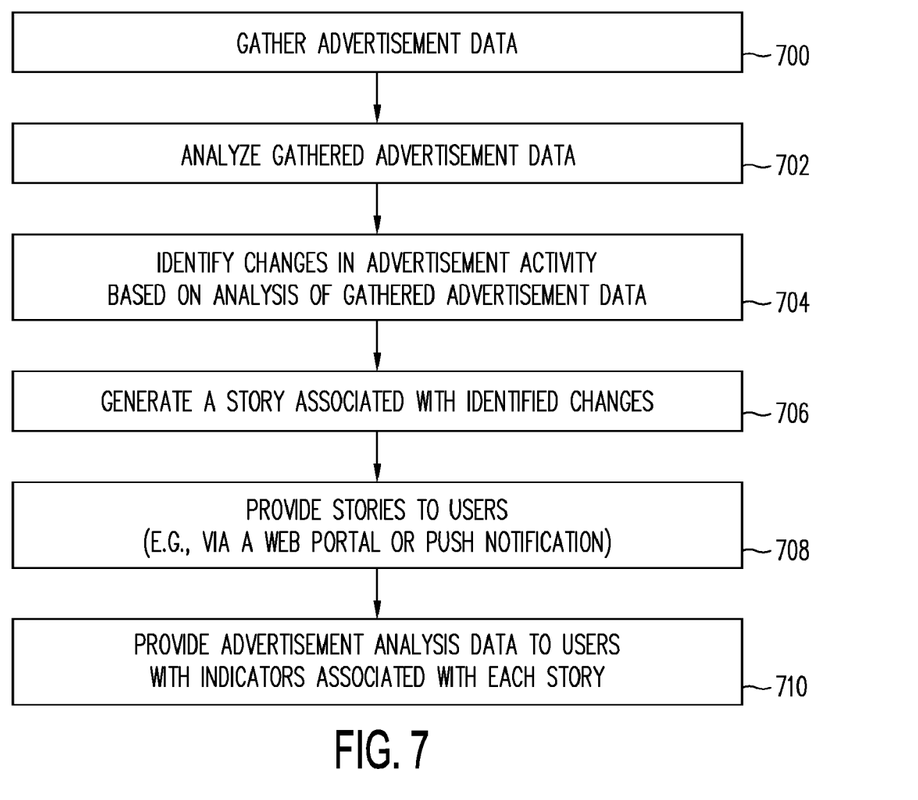
FIG. 7 is a flow chart of illustrative steps that may be used in identifying and reporting marketplace events in accordance with an embodiment of the present invention.

Illustrative steps that may be involved generating aggregated advertisement data displays as described herein are shown in FIG. 7.

At step 700, advertisement data such as web-based advertisement data may be gathered using, for example, advertising discovery equipment 12 of FIG. 1. Gathering the advertisement data may include obtaining a list of URLs of publisher websites to be explored, gathering HTTP request data from publisher servers and linked servers associated with the URLs in the obtained URL list while spidering the websites associated with the obtained URL list, and generating a list of HTTP requests based on the gathered HTTP request data.

At step 702, the gathered advertisement data may be analyzed to determine one or more marketplace events, to generate advertisement measure timelines or other time series advertisement measure data, and to sort the advertisement data by site, by advertiser, by ad network, by DSP, by ad service, etc. Analyzing the gathered advertisement data may include processing the HTTP request list, identifying advertisements such as advertisement creatives in the HTTP request data associated with a publisher website, identifying placement pathways for each identified advertisement, and generating site-specific header information, one or more site-specific data trees, and ad-block-specific summary data for each publisher website in the URL list.

Identifying placement pathways of advertisements on publisher websites may include identifying the time at which each HTTP request was made, excluding later HTTP requests as possible sources of earlier HTTP requests, and extracting one or more references to a current HTTP request (e.g., references to a URL associated with the current HTTP request) from HTTP request data associated with earlier HTTP requests. Extracting references to a current HTTP request from earlier HTTP request data may include searching redirect response headers and/or response bodies in HTTP request data associated with earlier HTTP requests for references to the current HTTP request.

Analyzing gathered advertisement data may include accumulating and aggregating processed advertisement data using data analysis and storage equipment 17. Stored processed advertisement data may be periodically obtained from a first database and may be sorted and combined using selected criteria. As examples, the selected criteria may include an advertiser, an advertising campaign, a publisher website, an ad creative, an ad service, an ad network, etc. The data that has been sorted and combined using these criteria may be used to form aggregated advertisement data 130 from which timelines may be generated, marketplace events may be detected, and associated stories may be generated and presented to users.

At step 704, one or more changes in marketplace activity such as advertisement activity may be identified based on the analysis of the gathered advertisement data. Changes in advertisement activity may include impression spikes, changes in impression shares, and/or detection of a new creative release (as examples).

At step 706, one or more stories may be generated that are associated with one or more of the identified changes in the marketplace activity. Stories may include new-creatives stories, partner-activity stories, impression-spike stories, or other stories associated with events detected in the gathered advertisement data.

At step 708, one or more of the generated stories may be provided to one or more users (e.g., via a web-based interface portal or via a push notification). Generated stories may all be provided to the user or only selected ones of the stories may be provided. For example, stories may be ranked and, if desired, stories that are highly ranked may be provided to the user and other stories with relatively lower ranks may be discarded.

At step 710, advertisement analysis data such as a timeline and/or statistical information associated with each story may be provided to the users. The advertisement analysis data may include one or more indicators associated with each story such as indicators of significant events on a timeline.

Figure 8:
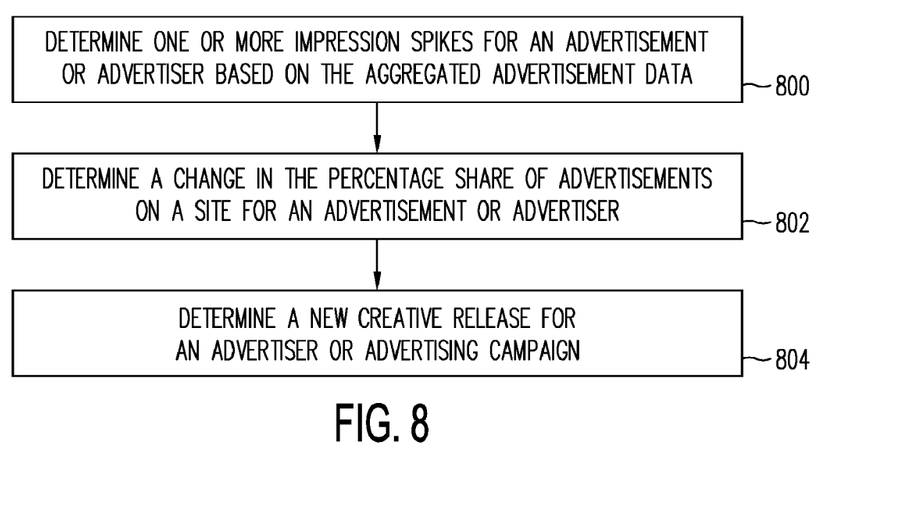
FIG. 8 is a flow chart of illustrative steps that may be used in detecting changes in advertisement activity in accordance with an embodiment of the present invention.

Illustrative steps that may be performed for identifying selected exemplary changes in advertisement activity based on analysis of gathered advertisement data are shown in FIG. 8.

At step 800, one or more impression spikes for an advertisement or advertiser (or advertising campaign) may be determined based on the aggregated advertisement data. Determining an impression spike may include determining a number of impressions associated with the advertisement, the advertiser or campaign on a particular day (or in another suitable time period) and comparing the determined number to an average or median number of impressions per day over another time period (e.g., a week or a month). An impression spike may be identified when the number of impressions is greater than the average (or median) number of impressions by a certain amount such as a threshold.

At step 802, one or more changes in the percentage share of advertisements on a site for an advertisement or advertiser (or campaign) may be determined. Determining a change in the percentage share of advertisements on a site may include determining an impression share on a particular day (or in another suitable time period) and comparing the determined impression share to an average or median impression share over another time period (e.g., a week or a month). A significant impression share change may be identified when the impression share is greater than the average impression share by a certain amount such as a threshold.

At step 804, a new creative release may be determined for an advertiser or advertising campaign. Determining a new creative release may include identifying a previously unidentified creative, for example. In another example, determining a new creative release may include identifying a spike in the number of creatives and identifying one or more previously unidentified creatives being displayed at or near the same time as the spike in the number of creatives.

Figure 9:
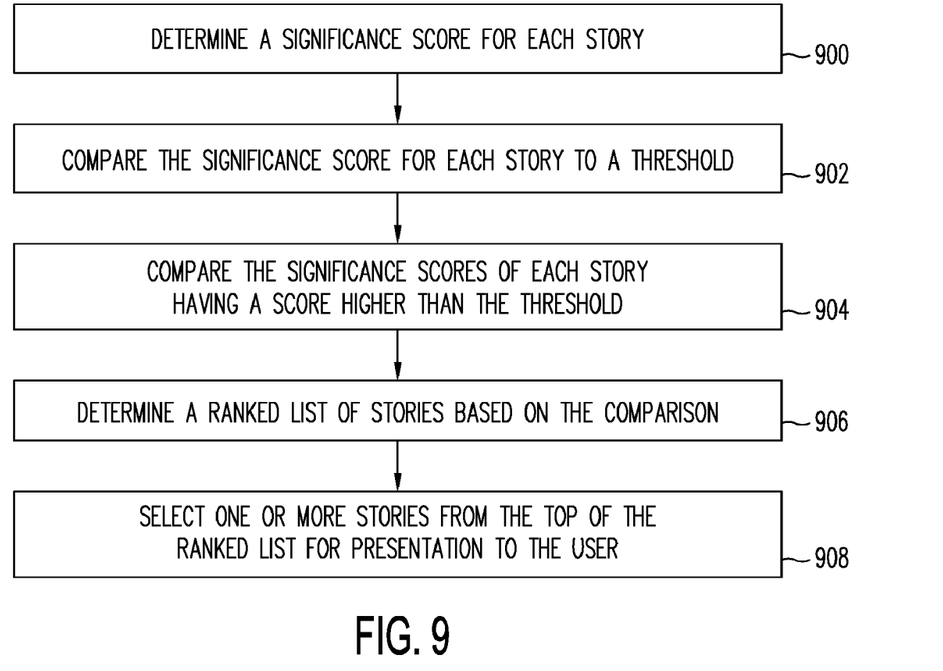
FIG. 9 is a flow chart of illustrative steps that may be used in providing event-related stories to users in accordance with an embodiment of the present invention.

Illustrative steps that may be used for providing stories to users are shown in FIG. 9.

At step 900, a significance score for each story may be determined. Determining a significance score may include assigning a number (e.g., a number between zero and one) to each story based on the amount of change detected in the aggregated advertisement data associated with that story (e.g., the size of an impression spike or the size of a change in impression share).

At step 902, the significance score for each story may be compared to a threshold. For example, in embodiments in which the significance score is a number between zero and one, the threshold may be 0.5, 0.6, 0.8, 0.9, 0.95 or any other suitable threshold for determining significant stories.

At step 904, the significance scores for each story having a score higher than the threshold may then be compared to each other. At step 906, a ranked list of stories may be determined based on the comparison. For example, the ranked list may be a list of all stories 20 having a significance score higher than the threshold in order of highest significance score to lowest significance score.

At step 908, one or more stories from the ranked list (e.g., stories from the top of the ranked list) may be selected for presentation to the user. For example, the top five stories may be selected, the top three stories may be selected or the top one story may be selected (as examples). The number of selected stories may be fixed, capped, or may be variable depending on the significance scores. In some situations, no stories may be presented (e.g., if no stories have significance scores higher than the threshold). In other situations, the number of presented stories may be temporarily increased relative to a standard number of stories (e.g., three or five stories) due a large number of stories with unusually high significance scores.

Figure 10:
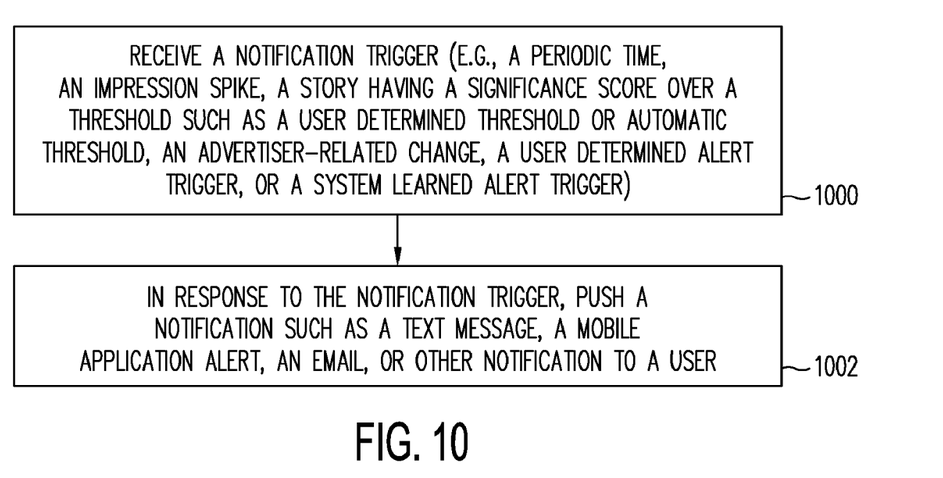
FIG. 10 is a flow chart of illustrative steps that may be used in notifying users of marketplace events in accordance with an embodiment of the present invention.

In some situations, users may desire to have advertisement data such as marketplace stories pushed to their devices without having to log in to a web service or application. Illustrative steps that may be used for pushing marketplace event stories to users are shown in FIG. 10.

At step 1000, a notification trigger may be received (e.g., at user interface equipment such as user interface equipment 18 of FIG. 1). A notification trigger may be a periodic time, a marketplace data change such as an impression spike, a story having a significance score over a threshold such as a user-determined threshold or an automatic threshold, an advertiser-related change, or other trigger such as a user-determined trigger, or a system learned trigger. The notification trigger may be received, for example, from data analysis and storage equipment 17 when one of the above conditions is met. A user-determined trigger may be a triggering change detection that meets a user-determined trigger threshold. For example, the user may request to be notified when impression spikes above a certain user-defined threshold are identified. In another example a user such as an advertising network may request to be notified if a competing ad network has an increase in impression shares sold over a user-defined threshold.

In some embodiments, the system may learn alert triggers for particular users. For example, if a user commonly views site-specific data displays, stories that are generated for site-specific data displays may be determined by the system to be triggers for that user.

At step 1002, the system may push a notification such as a text message, a mobile application alert, an email, or other notification to the user in response to the notification trigger. The push notification may be a customer alert notification such as notification 262 of FIG. 5 or may be a text or other alert including a link to view an aggregated data display 254.

The foregoing is merely illustrative of the principles of this invention and various modifications can be made by those skilled in the art without departing from the scope and spirit of the invention.

What is claimed is:

1. A computer-implemented method comprising:
   causing placement of a plurality of digital elements on a plurality of publisher websites by a plurality of channels by loading each of the plurality of publisher websites at a plurality of different times;
   detecting the plurality of placed digital elements, at least in part by extracting references to the placed digital elements in hypertext transfer protocol response data received while loading each of the plurality of publisher websites;
   determining placement pathways by which the plurality of digital elements were placed on the plurality of publisher websites at least in part by identifying cause-and-effect relationships between the references to the placed digital elements by excluding later hypertext transfer protocol requests as possible sources of earlier hypertext transfer protocol requests;
   generating at least one timeline based on the placed digital elements;
   identifying a change in the placed digital elements corresponding to a change in the at least one timeline;
   identifying an event associated with the identified change;
   generating at least one story associated with the identified event; and
   providing the at least one timeline and the at least one story for display for a user.

2. The method of claim 1, wherein the at least one story includes at least one numerical value that describes the identified change.

3. The method of claim 2, wherein the at least one numerical value comprises a number of new creatives or an impression share percentage.

4. The method of claim 1, wherein providing the at least one timeline and the at least one story for display for the user comprises providing at least one indicator on the timeline that is associated with the at least one story, and wherein the timeline comprises a graph of an advertisement measure over the plurality of different times.

5. The method of claim 4, wherein the at least one indicator is located at the change in the at least one timeline and wherein the change in the at least one timeline is a peak, an increase, a decrease, or an inflection point of the at least one timeline.

6. The method of claim 1, wherein providing the at least one timeline and the at least one story to the user comprises:
   determining a significance score for each of a plurality of stories;
   determining a ranked list of stories based on the determined significance scores;
   selecting the at least one story from the ranked list of stories; and
   displaying the at least one story and at least one other of the plurality of stories based on the determined significance scores.

7. The method of claim 6, wherein displaying the at least one story and at least one other of the plurality of stories based on the determined significance scores comprises:
   comparing the significance score of each story to a threshold;
   determining, based on the comparing, that the significance score of the at least one story and at least one other of the plurality of stories are above the threshold; and
   displaying the at least one story and at least one other of the plurality of stories.

8. The method of claim 1, wherein providing the at least one timeline and the at least one story to the user comprises providing the at least one timeline and the at least one story to the user with a web-based interface portal or a customer alert notification.

9. The method of claim 1, wherein the event associated with the at least one story comprises an impression spike, an increase in impression share, or a new creative release identified based on increase over an average by at least a threshold.

10. A system, comprising:
    discovery equipment configured to:
       cause placement of a plurality of digital elements on a plurality of publisher websites by a plurality of channels by loading each of the plurality of publisher websites at a plurality of different times; and
       detect the plurality of placed digital elements at least in part by extracting references to the placed digital elements in hypertext transfer protocol response data received while loading each of the plurality of publisher websites;
       determine placement pathways by which the plurality of digital elements were placed on the plurality of publisher websites at least in part by identifying cause-and-effect relationships between the references to the placed digital elements by excluding later hypertext transfer protocol requests as possible sources of earlier hypertext transfer protocol requests;

data analysis and storage equipment configured to:
generate at least one timeline based on the placed digital elements;
identify a change in the placed digital elements corresponding to a change in the at least one timeline;
identify an event associated with the identified change; and
generate at least one story associated with the identified event; and user interface equipment configured to provide the at least one timeline and the at least one story for display to a user.

11. The system of claim 10, wherein the identified change in at least one timeline is associated with an impression spike, a change in an impression share, or a new creative release.

12. The system of claim 11, wherein the at least one story comprises a new-creatives story, a partner-activity story, or an impression-spike story, and wherein the event associated with the at least one story comprises the impression spike, the change in the impression share, or the new creative release identified based on an increase in the at least one timeline over an average by at least a threshold.

13. The system of claim 11, wherein the discovery equipment includes a plurality of web crawlers configured load the plurality of publisher websites.

14. A method, comprising:
extracting marketplace data associated with a plurality of publisher websites from hypertext transfer protocol response header data received from the plurality of publisher websites by a plurality of web crawlers, at least in part by:
extracting references to a plurality of digital elements corresponding to the marketplace data in the hypertext transfer protocol response data received while loading each of the plurality of publisher websites; and
determining placement pathways by which the plurality of digital elements were placed on the plurality of publisher websites at least in part by identifying cause-and-effect relationships between the references to the placed digital elements in the hypertext transfer protocol response header data by excluding later hypertext transfer protocol requests as possible sources of earlier hypertext transfer protocol requests;
aggregating the extracted marketplace data over a period of time;
processing the aggregated marketplace data to generate a timeline;
detecting a marketplace event based on the timeline;
generating a story associated with the marketplace event; and
providing, responsive to the detection of the marketplace event, a notification to a user.

15. The method of claim 14, wherein the marketplace data comprises advertisement data.

16. The method of claim 15, wherein providing the notification to the user comprises providing a push notification to the user, wherein the push notification includes the timeline and the story.

* * * * *